United States Patent [19]
Uchida et al.

[11] Patent Number: 5,877,603
[45] Date of Patent: Mar. 2, 1999

[54] ELECTRIC CURRENT CONTROL METHOD FOR A SERVOMOTOR

[75] Inventors: Hiroyuki Uchida, Minamitsuru-gun; Yasusuke Iwashita, Oshino-mura; Yuichi Endo, Oshino-mura; Takashi Okamoto, Oshino-mura, all of Japan

[73] Assignee: Fanuc Ltd, Minamitsuru, Japan

[21] Appl. No.: 836,712

[22] PCT Filed: Sep. 17, 1996

[86] PCT No.: PCT/JP96/02661

§ 371 Date: May 13, 1997

§ 102(e) Date: May 13, 1997

[87] PCT Pub. No.: WO97/10643

PCT Pub. Date: Mar. 20, 1997

[30] Foreign Application Priority Data

Sep. 14, 1995 [JP] Japan .................................. 7-261042

[51] Int. Cl.$^6$ ............................................ H02P 5/408
[52] U.S. Cl. ...................... 318/434; 318/609; 318/805; 318/601; 388/815; 388/806
[58] Field of Search ............................ 318/434, 716, 318/802, 806, 805, 439, 432, 803, 609, 610, 601, 604; 388/806, 815, 821

[56] References Cited

U.S. PATENT DOCUMENTS 4,680,525  7/1987  Kobari et al. .
5,083,039  1/1992  Richardson et al. ..................... 290/44
5,652,495  7/1997  Narazaki et al. ....................... 318/176
5,777,447  7/1998  Okano ................................... 318/434

FOREIGN PATENT DOCUMENTS 57-113789  7/1982  Japan .

*Primary Examiner*—John W. Cabeca
*Attorney, Agent, or Firm*—Staas & Halsey

[57] ABSTRACT

An electric current control method for a servomotor in which a reactive current is lowered in a region where a voltage saturation does not occur, to suppress generation of heat caused by the reactive current and achieve a stable rotation up to a high-speed region. In the current control of the servomotor using a DQ conversion, an electric current is not supplied to d-phase and supplied only to q-phase when a rotational speed of the servomotor is not high, and the reactive current is supplied to the d-phase only when the rotational speed of the servomotor is high, to thereby lower the terminal voltage of the servomotor by the reactive current. Thus, the reactive current is reduced in the region where the voltage saturation does not occur, to thereby suppress the generation of heat due to the reactive current, and also achieve the stable rotation even in the high-speed region.

3 Claims, 9 Drawing Sheets

[IN ACCELERATION]

[IN HIGH-SPEED ROTATION]

ELECTRIC CURRENT CONTROL METHOD FOR A SERVOMOTOR

TECHNICAL FIELD

The present invention relates to an electric current control method for an AC servomotor used as a driving power source for machinery such as machine tools and industrial machines or for robots.

BACKGROUND ART

FIG. 7 is a block diagram showing a conventional AC servomotor control system. In this control system, a position deviation is obtained by subtracting a position feedback value detected by an encoder or the like from a position command, and a speed command is obtained by a position loop process in which the position deviation is multiplied by a position gain in term 1. A speed deviation is obtained by subtracting a speed feedback value from the speed command, and a speed loop process for proportional-plus-integral control is performed in term 2 to obtain a torque command (current command). Further, a current feedback value is subtracted from the torque command, then a current loop process is performed in term 3 to obtain voltage commands for individual phases, and PWM control or the like is performed to control an AC servomotor M.

To control a three-phase AC servomotor by the control system described above, there is known an alternating-current control method in which currents of three phases are separately controlled in the current loop. In this current control method, the torque command (current command) obtained by the speed loop process is multiplied by each of sine waves which are shifted by an electrical angle of 2π/3 for U, V and W phases, respectively, from a rotor position θ of the servomotor detected by an encoder or the like, to obtain the current command for respective phases. Then, current deviations are obtained by subtracting actual currents Iu, Iv and Iw of the three phases, which are detected by current detectors, from the obtained three current commands, and proportional-plus-integral (PI) control or the like is performed by current controllers for respective phases, to thereby output command voltages Eu, Ev and Ew for the phases to a power amplifier. The power amplifier performs PWM control by means of inverters etc., so that currents Iu, Iv and Iw of the individual phases are fed to the servomotor M to drive the same. In this way, a current loop is formed as an innermost minor loop in the position and speed loops, and this current loop controls the currents of three phases to be sent to the AC servomotor.

In the above method for controlling the currents of the three phases separately, since the frequency of each current command rises as the rotational speed of the motor increases to cause the gradual phase lag of the current, the reactive component of current increases to rise a problem that torque cannot be generated with good efficiency. Also, since the controlled variable is alternating current, even in a steady state in which the rotational speed and the load are constant, deviations such as a phase lag with respect to the command, attenuation of the amplitude, etc. occur, making it difficult to attain torque control comparable to that attainable with a direct-current motor.

As a solution to the above problems, a DQ control method is known wherein the three-phase current is converted into a two-phase, i.e., d- and q-phase, direct-current coordinate system through a DQ conversion, and then the individual phases are controlled by direct-current components.

FIG. 8 illustrates a control system in which an AC servomotor is controlled through the DQ conversion. It is assumed that the d-phase current command is "0", and that the current command for q-phase is a torque command outputted from the speed loop. In a converter 9 for converting the three-phase current to a two-phase current, d- and q-phase currents Id and Iq are obtained by using actual currents of u-, v- and w-phases of the motor, and the phase of the rotor detected by a rotor position detector 7, and the currents thus obtained are subtracted from the command values of the respective phases, to obtain d- and q-phase current deviations. In current controllers 5d and 5q, the respective current deviations are subjected to proportional and integral control, to obtain d- and q-phase command voltages Vd and Vq, respectively. Another converter 8 for converting the two-phase voltage to a three-phase voltage, obtains u-, v- and w-phase command voltages Vu, Vv and Vw from the two-phase command voltages Vd and Vq, and outputs the obtained command voltages to a power amplifier 6, whereby currents Iu, Iv and Iw are fed to the respective phases of the servomotor by means of inverters etc. to control the servomotor M.

The conventional current control method described above has a problem that the current control system becomes unstable due to counter-electromotive force.

FIG. 9 is a diagram illustrating the conventional AC servomotor control system by separating it into d- and q-phase control systems. As illustrated, d- and q-phase controllers are provided with integral terms 11 and 12 (K1 is an integral gain) and proportional terms 13 and 14 (K2 is a proportional gain), respectively, and the motor is expressed as a combination of a resistance R and an inductance L. Also, the d and q phases are provided with interference terms 15 and 16, respectively. The d-phase controller controls a current component that does not contribute to a torque generated by the motor, and the q-phase controller controls a current component that contributes to the torque generated by the motor.

In FIG. 9, with the control method in which a d-phase current command Id* for the d-phase controller is set to zero while the torque command is applied to the q-phase controller as a q-phase current command Iq*, no reactive current flows in the d-phase direction, so that the current component that does not contribute to the driving of the motor can be removed, but in the q phase, a counter-electromotive force E (=ωe·Φ) proportional to the rotational speed ωe of a motor is generated. FIG. 10 shows d- and q-phase voltage states during acceleration in the case where the d-phase current command Id* is set to zero. In FIG. 10, the circle represents a DC linkage voltage. The q-phase voltage R·Iq due to the resistance R of the q-phase winding shown in FIG. 9 is an active voltage for controlling the motor, while the voltage ωe·L·Iq generated in the d phase due to the interference term 15 is a reactive voltage that does not contribute to the driving of the motor. Symbol E denotes the counter-electromotive force. The terminal voltage of the motor is equal to the sum of the counter-electromotive force E and R·Iq. Control of the motor is possible when the terminal voltage is lower than or equal to the DC linkage voltage, and it is difficult to control the motor when the terminal voltage exceeds the DC linkage voltage.

FIG. 11 shows the d- and q-phase voltage states in which the counter-electromotive force E and the DC linkage voltage coincide with each other. In the case where the motor is accelerated to a high speed, the voltage for generating an acceleration current decreases due to an increase of the counter-electromotive force E. Therefore, the acceleration current decreases, and the counter-electromotive force finally coincides with the DC linkage voltage, thus terminating the acceleration. If the motor in this state is to be decelerated, a sufficient voltage is not available for generating a deceleration current, making it difficult to perform current control and possibly causing abnormal current flow.

In order to lower the terminal voltage of the motor in high-speed region, there is known a method in which the current phase is shifted in the d-phase direction when a heavy current flows in high-speed region. FIG. 12 shows the d- and q-phase voltage states when the current phase is shifted in the d-phase direction. In this case, the component Iqd in the d-phase direction of the q-phase current Iq flows in the d-phase direction, whereby the voltage $\omega e \cdot L \cdot Iqd$ generated in the q phase lowers the counter-electromotive force which appears in the terminal voltage. With this method, however, when the amount of current is small, the current in the d-phase direction is also small, thus rising a problem that the counter-electromotive force cannot be reduced sufficiently.

DISCLOSURE OF THE INVENTION

The present invention provides an electric current control method for a servomotor, capable of suppressing generation of heat due to a reactive current in a low-speed region where a voltage saturation does not occur, and also realizing a stable rotation in a high-speed region.

According to the present invention, in the current control of the servomotor using the DQ conversion, an electric current is not supplied to the d phase and supplied only to the q phase when a rotational speed of the servomotor is not high, and the reactive current is supplied to the d phase only when the rotational speed of the servomotor is high, to thereby lower the terminal voltage of the servomotor by the reactive current. Thus, the reactive current is reduced in the region where the voltage saturation does not occur, to thereby suppress the generation of heat due to the reactive current, and also achieve the stable rotation even in the high-speed region.

Before the rotational speed of the motor reaches high speed region, the counter-electromotive force generated in the motor is sufficiently small compared with the DC linkage voltage of a servo amplifier, and thus a voltage high enough to generate a control current for the motor can be obtained. In this region, a d-phase current command is set to zero to inhibit the supply of current to the d phase, while a current is supplied only to the q phase in the servomotor current control using the DQ conversion. Consequently, an active voltage is generated only in the q phase which contributes to a driving control of the motor, while no reactive current is supplied to the d phase which does not contribute to the driving control of the motor, whereby preventing the generation of heat due to the reactive current.

When the rotational speed of the motor reaches the high speed region to increase the counter-electromotive force to such a high value close to the DC linkage voltage of the servo amplifier that causes the voltage saturation, it becomes impossible to obtain a voltage high enough to generate the control current for the motor. When the reactive current is supplied to the d phase in such high-speed rotation, a voltage is produced at the d-phase winding due to the reactive current. The voltage generated due to the inductance of the d-phase winding is opposite in direction to the counter-electromotive force, and therefore, the counter-electromotive force decreases to thereby lower the terminal voltage of the motor. As a result, the terminal voltage becomes smaller than the DC linkage voltage of the servo amplifier, thus making it possible to obtain a voltage high enough to generate the motor control current.

Thus, the motor control is performed in such a manner that an electric current is supplied only to the q phase to minimize the generation of heat in the rotational speed region where the voltage saturation does not occur, and an electric current is supplied to the d phase to reduce the counter-electromotive force and stabilize the motor rotation in the high rotational speed region where the voltage saturation may occur.

The supply of the reactive current may be started from a set speed close to a speed at which the voltage saturation occurs so that the reactive current increases in accordance with the motor speed. In this way, before the set speed is reached, the control is performed based only on the q-phase active current, and when the motor speed become higher than or equal to the set speed, the value of the reactive current is increased in accordance with the motor speed, to thereby suppress increase of the counter-electromotive force which develops with the motor speed.

The supply of the reactive current may be increased according to a positive linear function with respect to the motor speed and may be set at a fixed value when the motor speed has become higher than or equal to a second set speed. In this way, the rate of increase of the reactive current can be set by a coefficient of the positive linear function, thereby suppressing the heat generation due to the reactive current at a motor speed higher than or equal to the second set speed.

BEST MODE OF CARRYING OUT THE INVENTION

Figure 1:
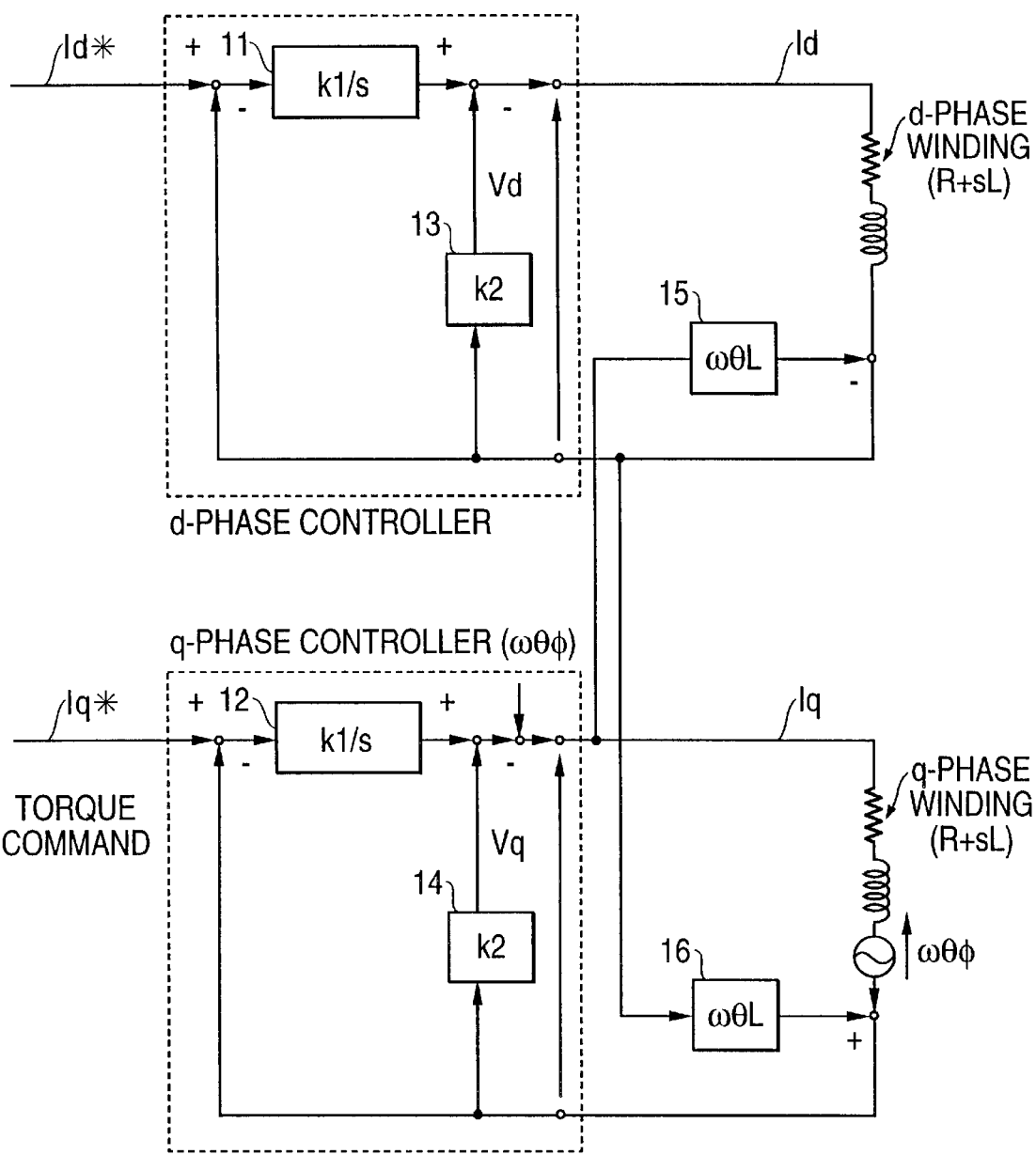
FIG. 1 is a block diagram of an AC servomotor control system for carrying out a method of the present invention, in which d- and q-phase control systems are shown separately.

In the block diagram of FIG. 1, a current command for a d-phase control system is set in accordance with a motor speed, so that a voltage in a direction opposite to a counter-electromotive force E (=$\omega e \cdot \Phi$) is substantially generated to thereby reduce the counter-electromotive force E.

As seen from the block diagram of FIG. 1, d- and q-phase controllers are provided with integral terms 11 and 12 (K1 is an integral gain) and proportional terms 13 and 14 (K2 is a proportional gain), respectively, and a motor is represented by a combination of a resistance R and an inductance. Also, the d and q phases are provided with interference terms 15 and 16, respectively, with respect to each other. This configuration is similar to the conventional one shown in the block diagram of FIG. 9.

Figure 2:
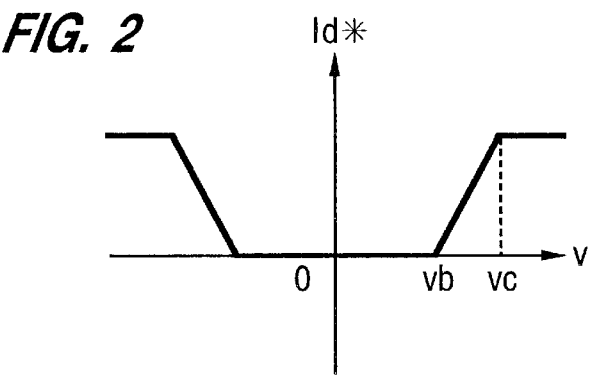
FIG. 2 is a graph showing the characteristic of a d-phase current command according to an embodiment of the present invention.

According to the present invention, a d-phase current command Id* in accordance with the rotational speed of the motor is supplied to the d-phase controller, and a torque command Iq* is supplied to the q-phase controller. As the d-phase current command Id* in accordance with the rotational speed of motor, a d-phase current command having a characteristic shown in FIG. 2 is adopted, for example. The d-phase current command shown in FIG. 2 is held to be zero in a speed region in which the motor rotational speed v falls within a range from zero to a base speed vb. The d-phase current command is increased in proportion to the rotational speed v in a high-speed region in which the rotational speed v exceeds the base speed vb, and is set at a fixed value in an even higher-speed region in which the rotational speed v exceeds a clamp speed vc.

The base speed vb may be set to a value in the vicinity of the speed at which the counter-electromotive force approaches a DC linkage voltage and voltage saturation begins. The clamp speed vc may be set as a boundary speed at which undesirable phenomena such as generation of heat due to increase in d-phase current is allowable.

Figure 9:
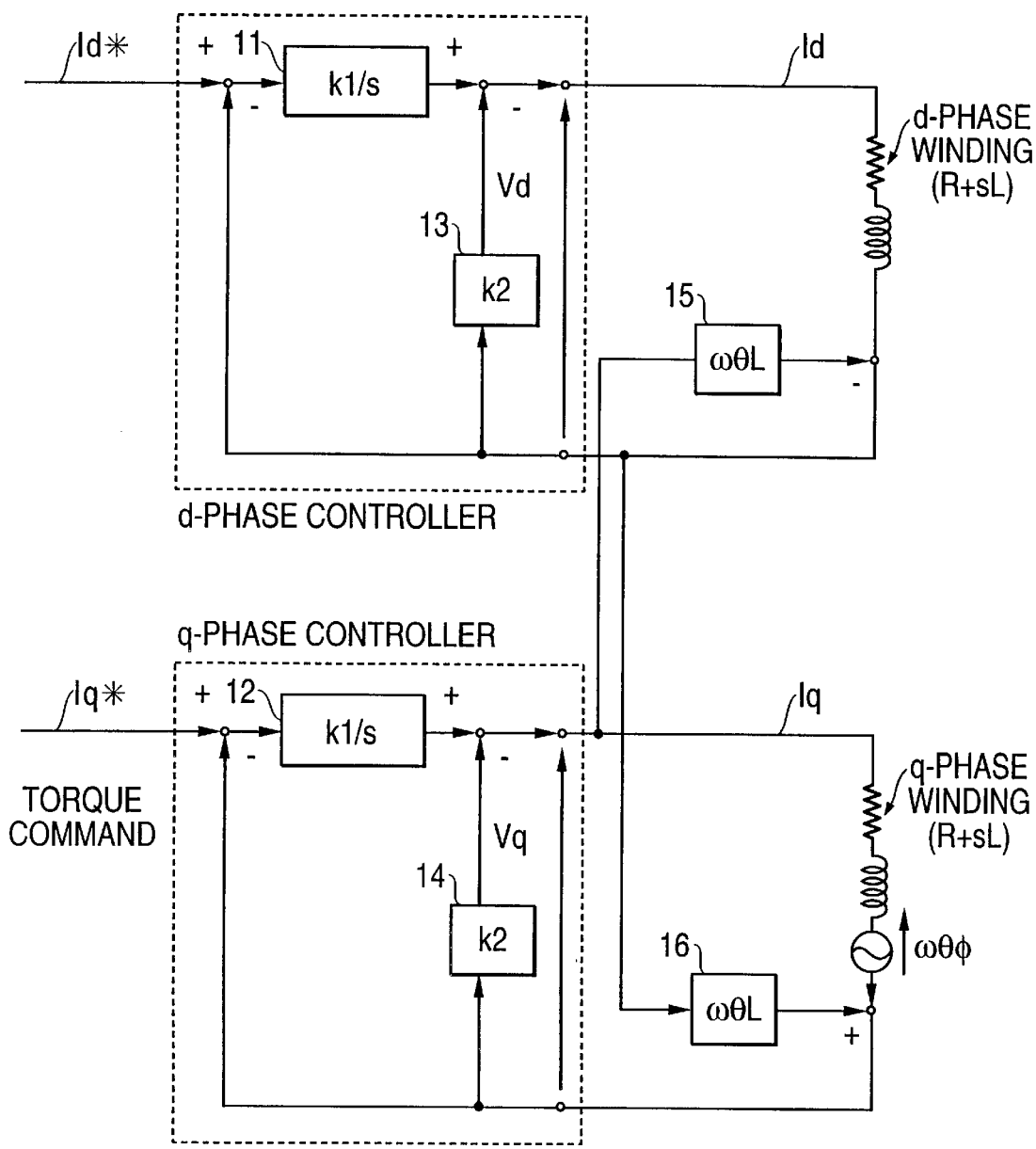
FIG. 9 is a block diagram of the AC servomotor control system, in which d- and q-phase control systems are shown separately.
Figure 10:
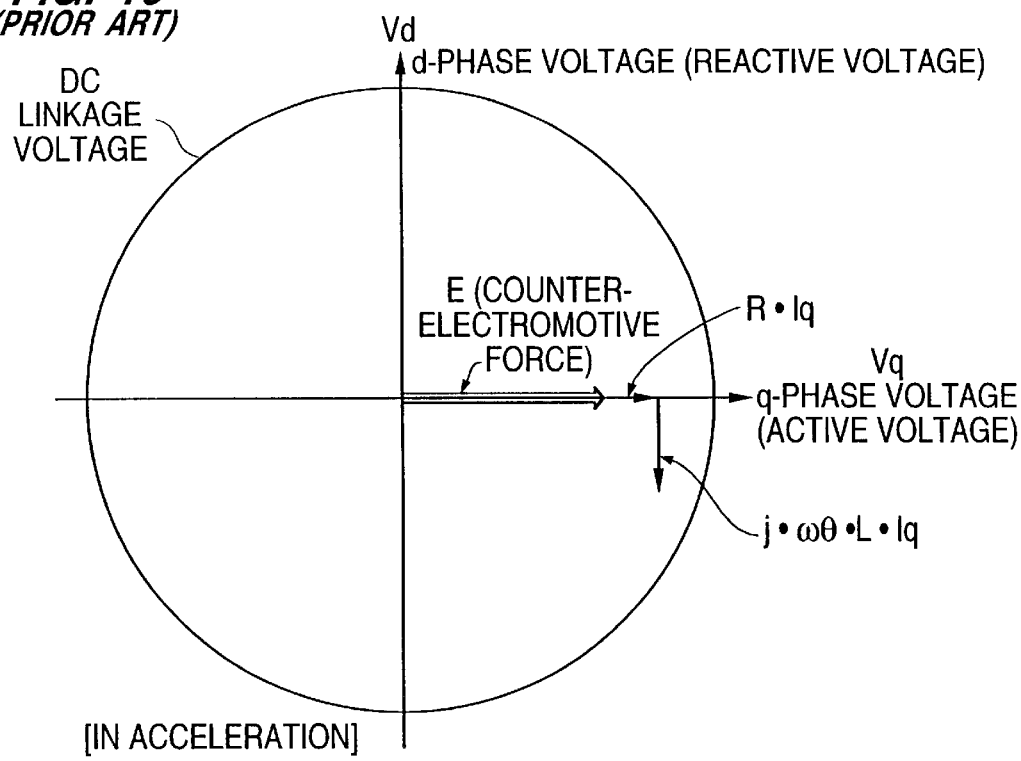
FIG. 10 is a diagram showing states of d- and q-phase voltages during acceleration in the case where a q-phase current command Iq* is set to zero according to a conventional method.
Figure 11:
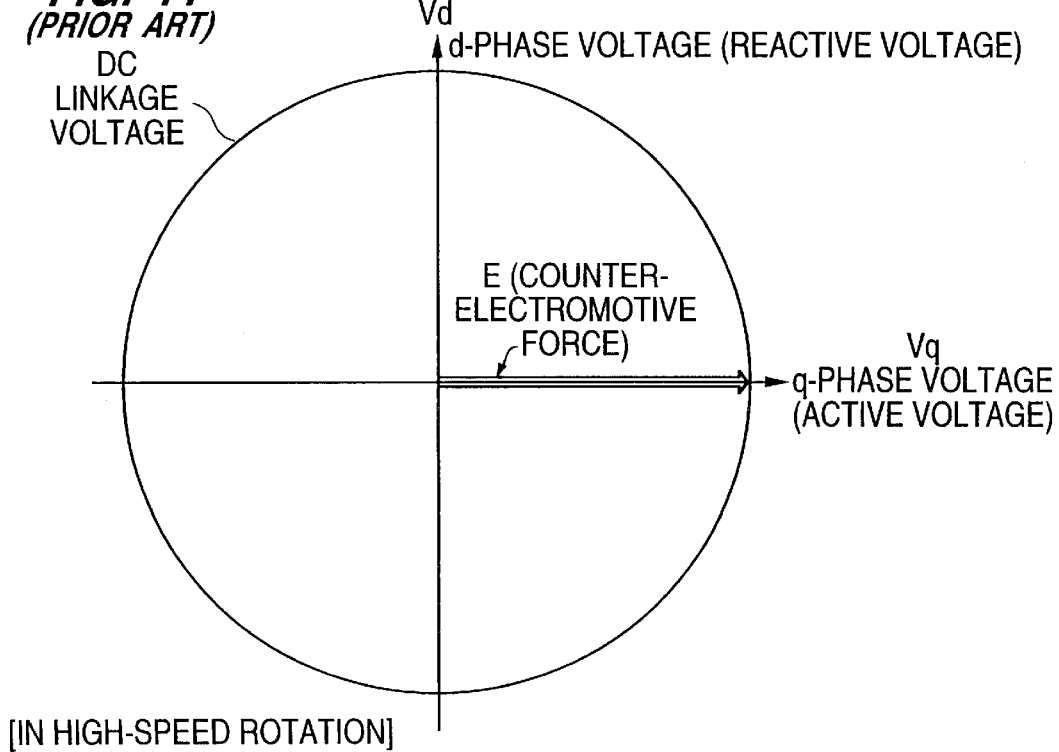
FIG. 11 is a diagram showing states of d- and q-phase voltages in which a counter-electromotive force and a DC linkage voltage coincide with each other in the conventional method.
Figure 12:
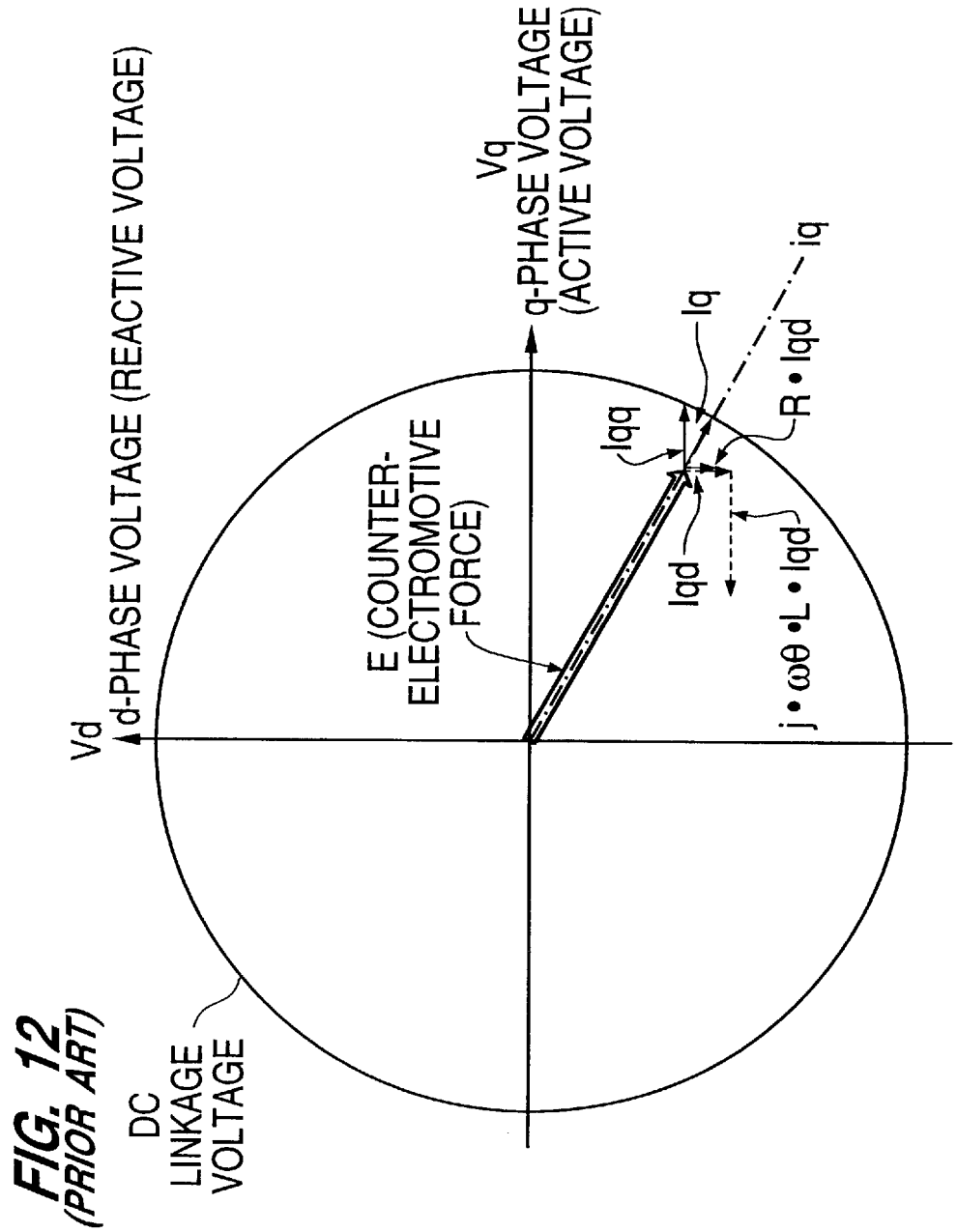
FIG. 12 is a diagram showing states of d- and q-phase voltages in which the current phase is shifted in the d-phase direction according to another conventional method.

In the low-speed region in which the rotational speed of the motor is lower than or equal to the base speed vb, the d-phase current command to be inputted to the d-phase controller is zero, as in the conventional control method as described referring to FIG. 9, and thus the states of the d- and q-phase voltages in acceleration are those as shown in FIG. 10. In this low-speed region in which the motor speed is lower than or equal to the base speed vb, a current for controlling the motor can be generated based on a voltage obtained by subtracting the counter-electromotive force E from the DC linkage voltage.

Figure 3:
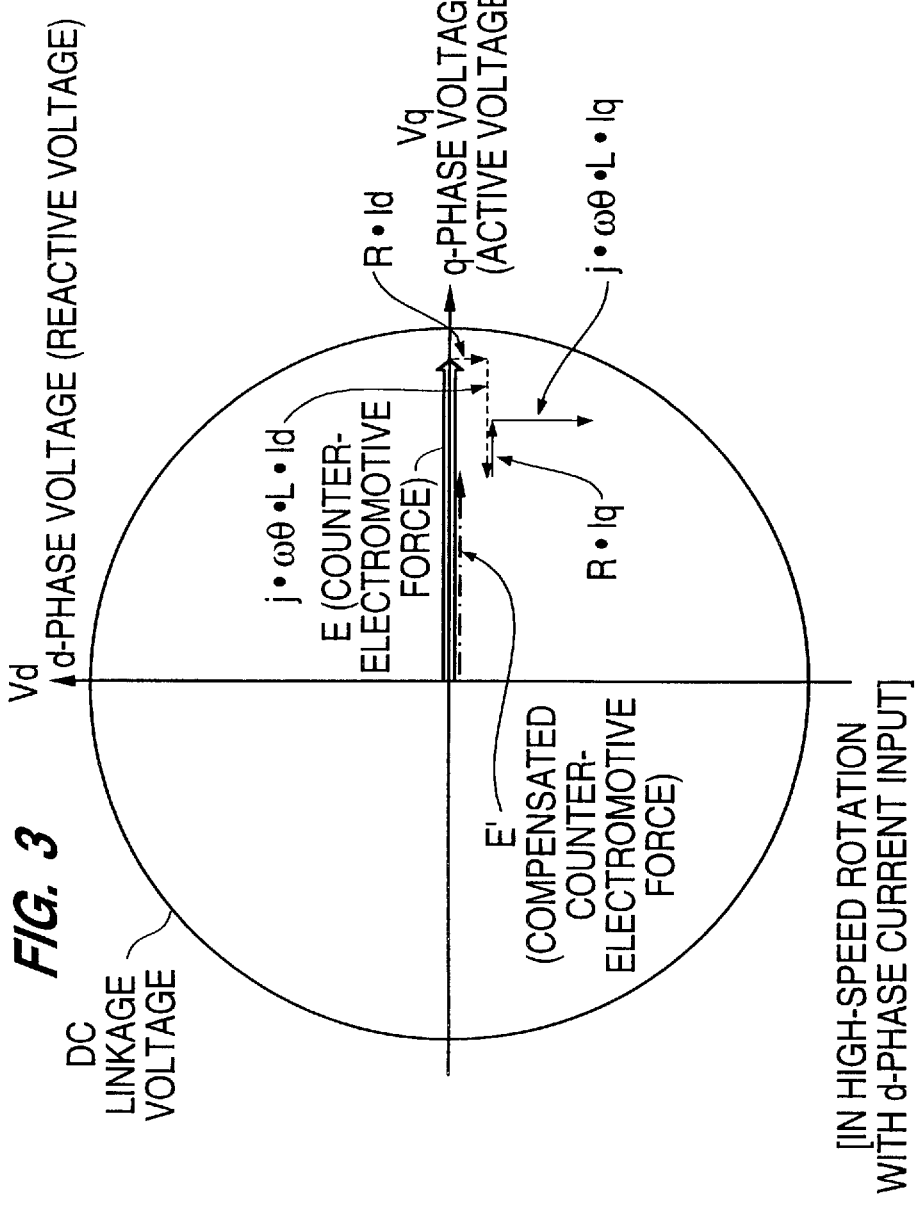
FIG. 3 is a diagram showing d- and q-phase voltage states in high-speed region.

As the rotational speed of the motor increases to exceed the base speed vb, the counter-electromotive force increases to approach the DC linkage voltage, and voltage saturation begins. At this stage, input of the d-phase current to the d-phase controller is started. FIG. 3 shows states of d- and q-phase voltage in the case where the q-phase current command Iq* is input in the high-speed region over the base speed vb. In FIG. 3, when a d-phase current Id flows through the d-phase winding in accordance with the d-phase current command Id*, a reactive voltage R·Id is generated due to the resistance R of the d-phase winding, and an active voltage $\omega e \cdot L \cdot Id$ is generated in the interference term 16 due to the inductance L of the d-phase winding (see the dotted lines in FIG. 3). The direction of this active voltage j·$\omega e \cdot L \cdot Id$ is opposite to that of the counter-electromotive force E, and, therefore, the counter-electromotive force decreases to be a compensated counter-electromotive force E', as indicated by the one-dot-chain line in the diagram. Consequently, the compensated counter-electromotive force E' remains lower than the DC linkage voltage with respect to the voltage in the direction of the q-phase voltage, thus reserving a sufficient voltage for supplying a control current. A voltage in the direction opposite to the counter-electromotive force E in FIG. 3 is the active voltage $\omega e \cdot L \cdot Id$ obtained by the inductance L of the d-phase winding, and the current supply to the d phase is substantially equivalent to an input of a voltage opposite to the counter-electromotive force E (=$\omega e \cdot \Phi$), to the q-phase controller, whereby the terminal voltage decreases.

When the rotational speed of the motor further increases, the counter-electromotive force E (=$\omega e \cdot \Phi$) further increases with the rotational speed. In this case, by increasing the d-phase current command Id* for the d-phase controller in accordance with the rotational speed, the active voltage $\omega e \cdot L \cdot Id$ generated by inductance L of the d-phase winding is increased to raise the voltage in the direction for canceling the counter-electromotive force E, whereby increase of the counter-electromotive force E is suppressed.

In the d-phase current command of FIG. 1, the d-phase current command value is fixed so as to clamp the d-phase current for a rotational speed v exceeding the clamp speed vc. This is intended to prevent undesirable phenomena such as excessive current flow or overheating due to unrestricted increase of the d-phase current.

Figure 4:
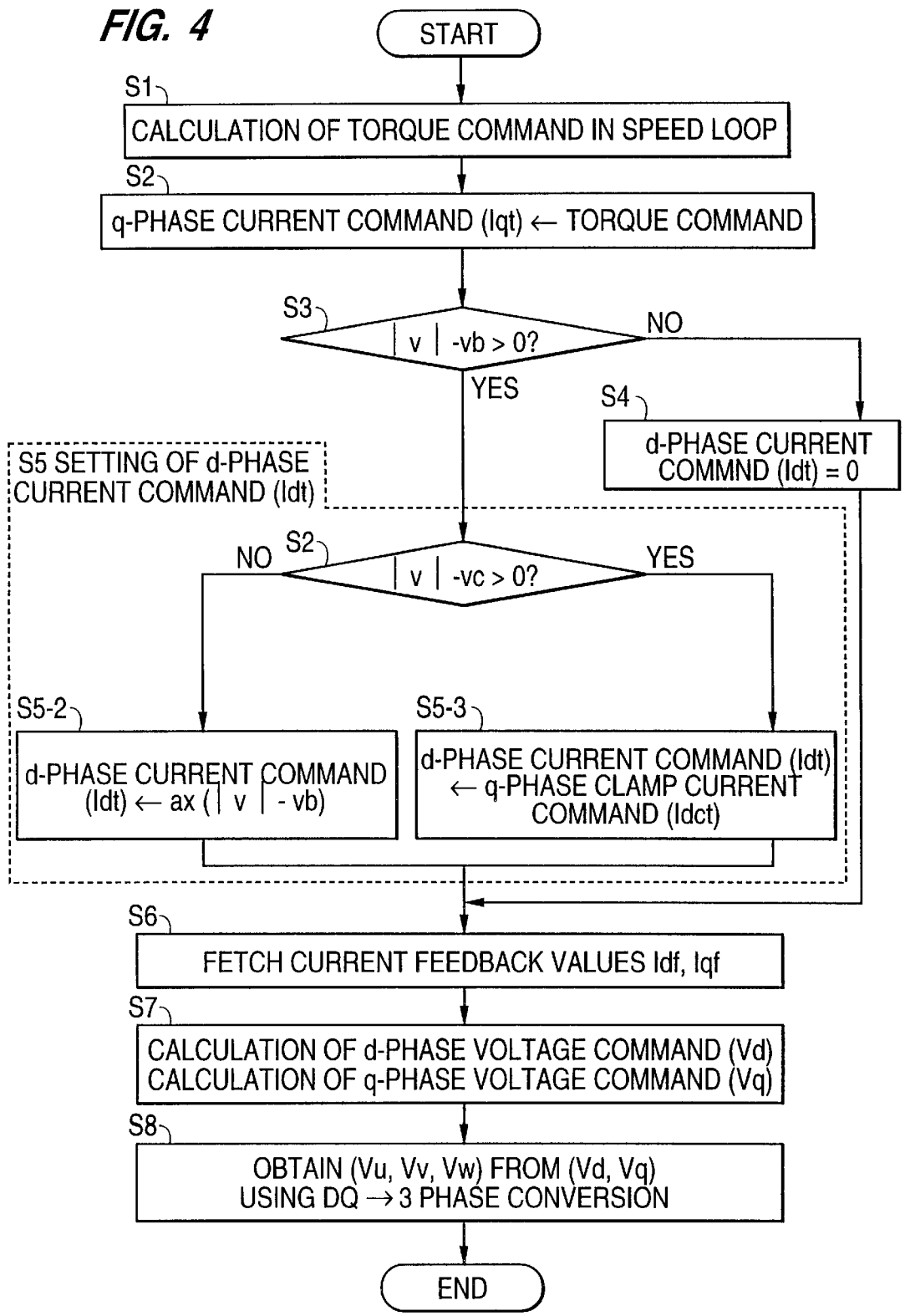
FIG. 4 is a flowchart showing the processes of speed and current loops.

Referring now to the flowchart of FIG. 4, the processes of speed and current loops will be explained.

Figure 7:
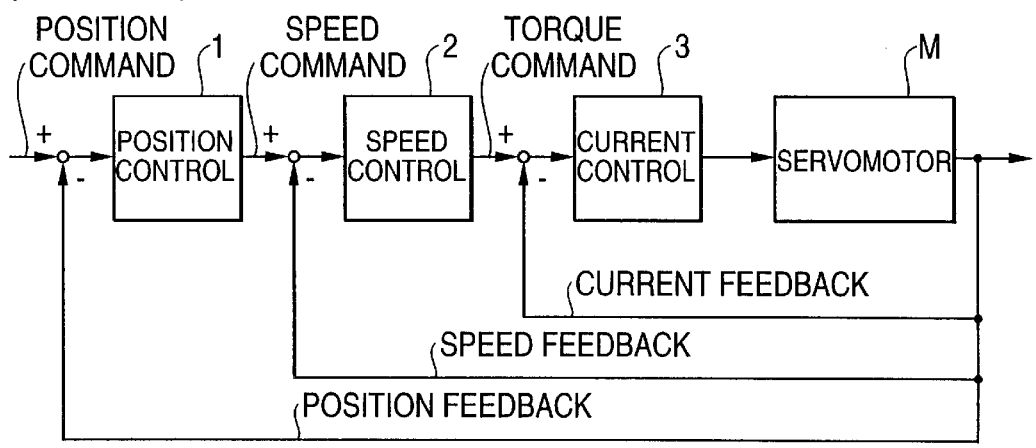
FIG. 7 is a block diagram of a conventional AC servomotor control system with position, speed and current loops.
Figure 8:
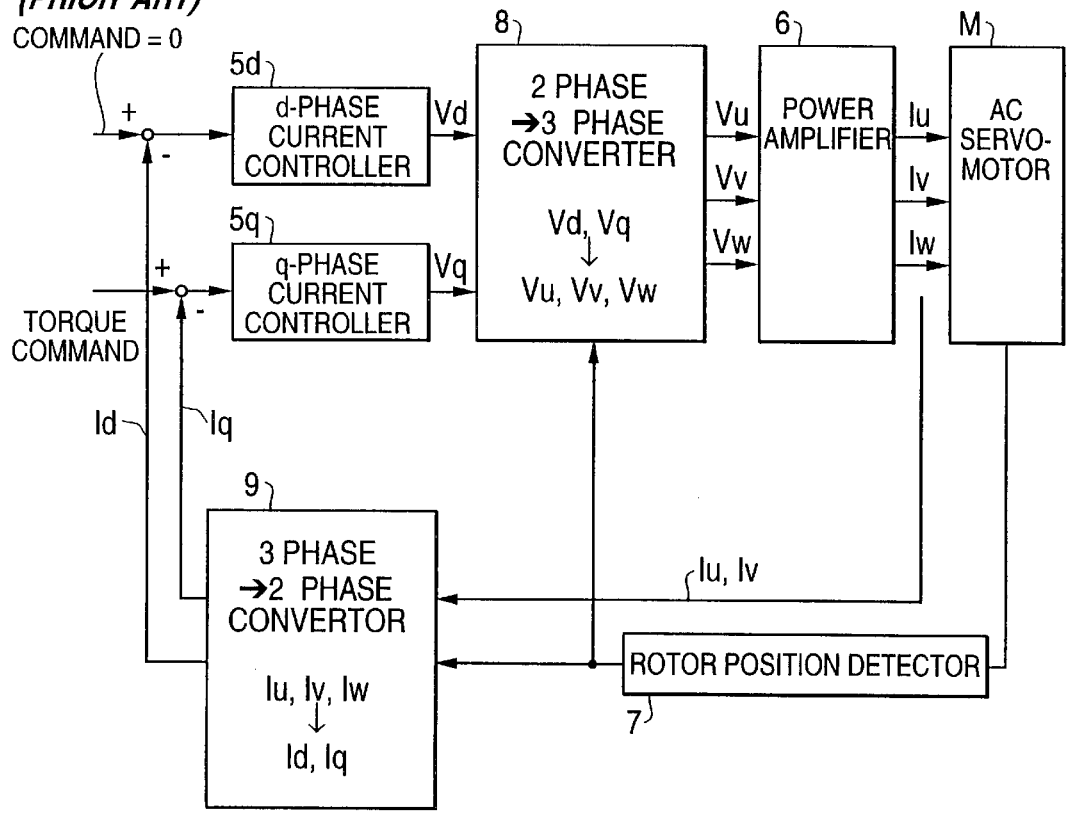
FIG. 8 is a block diagram of a control system in which an AC servomotor is controlled using a DQ conventional conversion.

First, a torque command is calculated by the speed loop process including the term 2 of the speed control shown in FIG. 7 (Step S1), and the obtained torque command is set as the q-phase current command Iq* (Step S2).

Subsequently, an actual speed v of the motor is obtained from an encoder, and is compared with the base speed vb. In this example, a difference (|v|–vb) between the absolute value of the actual speed v of the motor and the base speed vb is obtained, taking account of the rotating direction of the motor, and it is determined whether the speed difference is positive or negative (Step S3). The base speed vb is set to a value in the vicinity of the speed at which the counter-electromotive force approaches the DC linkage voltage to start the voltage saturation. The base speed vb can be set to a desired value in accordance with the characteristic of the motor used. For example, a rated speed of the motor, a motor speed attained by applying a rated voltage to the motor and a value obtained by multiplying either of the two speeds by a predetermined factor can be used.

When the rotational speed of the motor has not exceeded the base speed vb, the aforementioned speed difference becomes a negative value or zero. This speed region corresponds to the range a in FIG. 2, and, in this region, the d-phase current command Id* is set to zero (Step S4). At this time, the q-phase current command Iq* is the torque command set in said Step S2.

In the case where the rotational speed of the motor has exceeded the base speed vb, the aforementioned speed difference becomes a positive value. This speed region corresponds to a range b or a range c in FIG. 2, and in this speed region, the d-phase current command Id* is set in Step S5. At this time, the q-phase current command Iq* is the torque command set in said Step S2.

Steps S5-1 to S5-3 for setting the d-phase current command Id* will be explained.

In Step S5-1, the actual speed v of the motor obtained from the encoder is compared with the clamp speed vc. In this case, a difference (|v|–vc) between the absolute value of the actual speed v of the motor and the clamp speed vc is obtained, taking account of the motor rotating direction, and it is determined whether this speed difference is positive or negative (Step S5-1). The clamp speed vc may be set to a boundary speed at which undesirable phenomena such as generation of heat due to increase in the d-phase current is allowable.

When the rotational speed of the motor has not exceeded the clamp speed vc, the aforementioned speed difference becomes a negative value or zero. This speed region corresponds to the range b in FIG. 2. In this region, the d-phase current command is set to a value obtained by multiplying (|actual speed v|−clamp speed vc) by a coefficient α (Step S5-2). The coefficient α is a coefficient for increasing the d-phase current command Id* using a linear function in response to the rotational speed v, and a rate of increase of the d-phase current command Id* is adjustable by the coefficient. At this time, the q-phase current command Iq* is the torque command set in said Step S2.

In the case where the rotational speed of the motor has exceeded the clamp speed vc, the aforementioned speed difference takes a positive value. This speed region corresponds to the range c in the rectangle shown in FIG. 2, and in this region, the d-phase current command Id* is set to a clamp q-phase current command Idq* (Step S5-3). The clamp q-phase current command Idq* is set to a fixed value regardless of increase in the rotational speed v. At this time, the q-phase current command Iq* is the torque command set in said Step S2.

Subsequently, current feedback values Idf and Iqf of the d and q phases of the servomotor are fetched from the current feedback. The d- and q-phase current feedback values Idf and Iqf can be fetched by the following steps. First, actual currents Iu and Iv of the u and v phases of the servomotor are obtained. An actual w-phase current Iw is obtained through the calculation of Iw=−(Iu+Iv) based on the relation Iu+Iv+Iw=0. Subsequently, an electrical angle θe of the rotor is obtained based on the output of the rotor position detector, and performing the DQ conversion indicated by the following equation (1) to obtain a two-phase direct current from the three-phase alternating current (Step S6).

$$\begin{bmatrix} Id \\ Iq \end{bmatrix} = \sqrt{2/3} \cdot \begin{bmatrix} \cos\theta e & \sin\theta e \\ -\sin\theta e & -\cos\theta e \end{bmatrix} \cdot \begin{bmatrix} 1 & -1/2 & -1/2 \\ 0 & \sqrt{3/2} & -\sqrt{3/2} \end{bmatrix} \cdot \begin{bmatrix} Iu \\ Iv \\ Iw \end{bmatrix} \quad (1)$$

Subsequently, the d- and q-phase currents Idf and Iqf are subtracted respectively from the d- and q-phase command values to obtain d- and q-phase current deviations, which are subjected to the proportional and integral control in the current loop of current control block to obtain d- and q-phase command voltages Vd and Vq (Step S7). Further, the U-, V- and W-phase command voltages Vu, Vv and Vw are obtained by the DQ conversion for obtaining a three-phase alternating-current voltage from a two-phase direct-current voltage, as shown in the following equation (2) using the converter for converting a two-phase voltage to a three-phase voltage (Step S8). The obtained command voltages are outputted to the power amplifier to supply the currents Iu, Iv and Iw to the respective phases of the servomotor through inverters, thereby controlling the servomotor.

$$\begin{bmatrix} Vd \\ Vv \\ Vw \end{bmatrix} = \sqrt{2/3} \cdot \begin{bmatrix} 1 & 0 \\ -1/2 & \sqrt{3/2} \\ -1/2 & -\sqrt{3/2} \end{bmatrix} \cdot \begin{bmatrix} \cos\theta e & -\sin\theta e \\ \sin\theta e & \cos\theta e \end{bmatrix} \cdot \begin{bmatrix} Vd \\ Vq \end{bmatrix} \quad (2)$$

Figure 5:
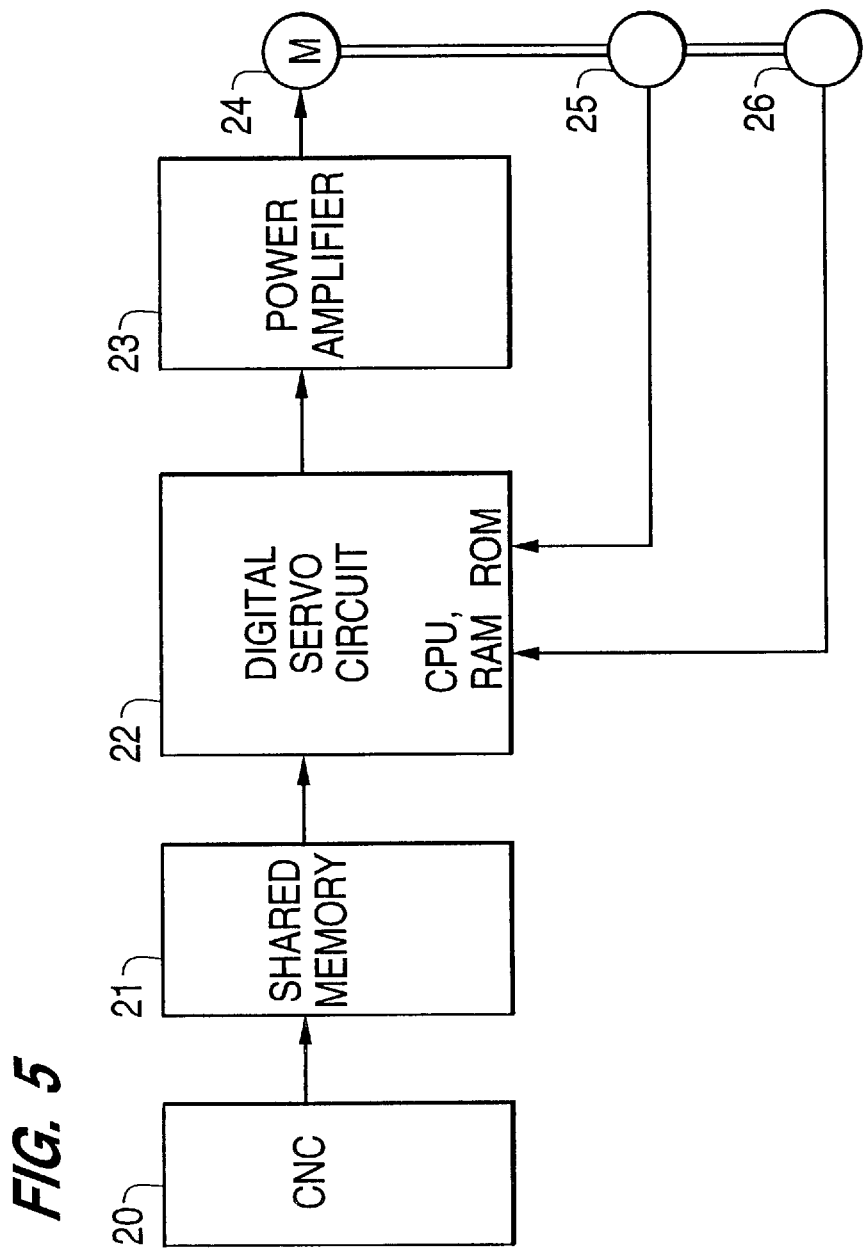
FIG. 5 is a block diagram of a servomotor control system for carrying out the method of the present invention.

FIG. 5 is a block diagram of a servomotor control system to which the present invention is applied. The configuration of this system is identical with that of a system for carrying out conventional digital servo control, and thus is illustrated only schematically. In FIG. 5, reference numeral 20 denotes a numerical control device (CNC) having a computer built therein, 21 denotes a shared RAM, 22 denotes a digital servo circuit including a processor (CPU), a ROM, a RAM, etc., 23 denotes a power amplifier such as a transistor inverter, M denotes an AC servomotor, 24 denotes an encoder for generating pulses according to the rotation of the AC servomotor M, and 25 denotes a rotor position detector for detecting the rotor phase.

Figure 6A:
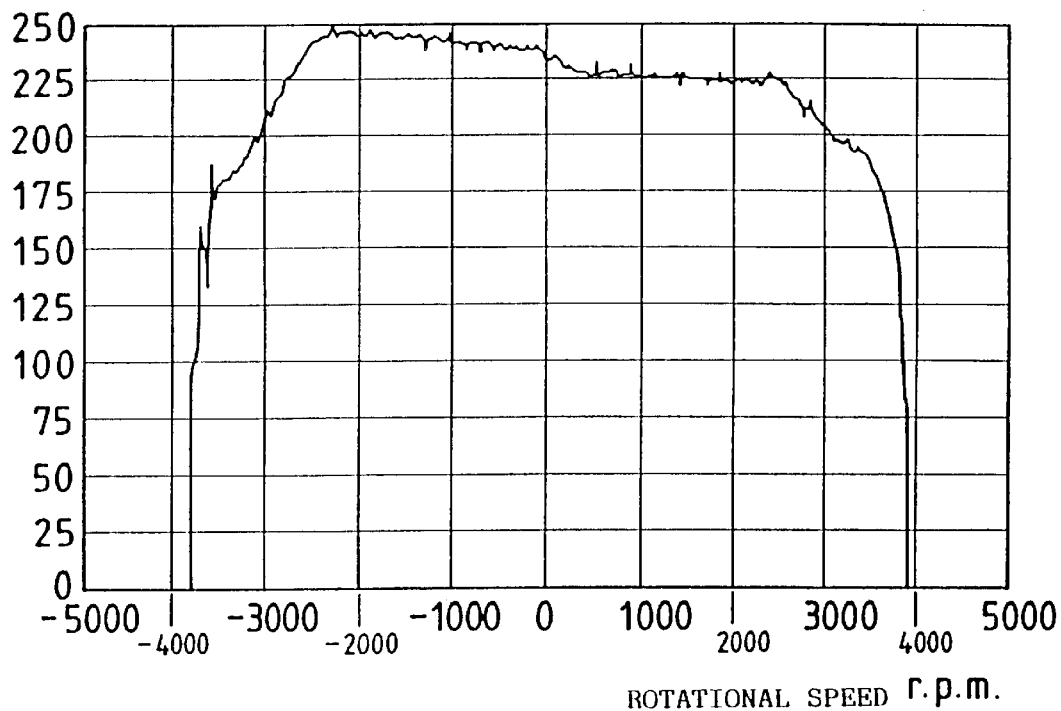
FIG. 6a is a graph showing a servomotor torque curve in accordance with a conventional control method.
Figure 6B:
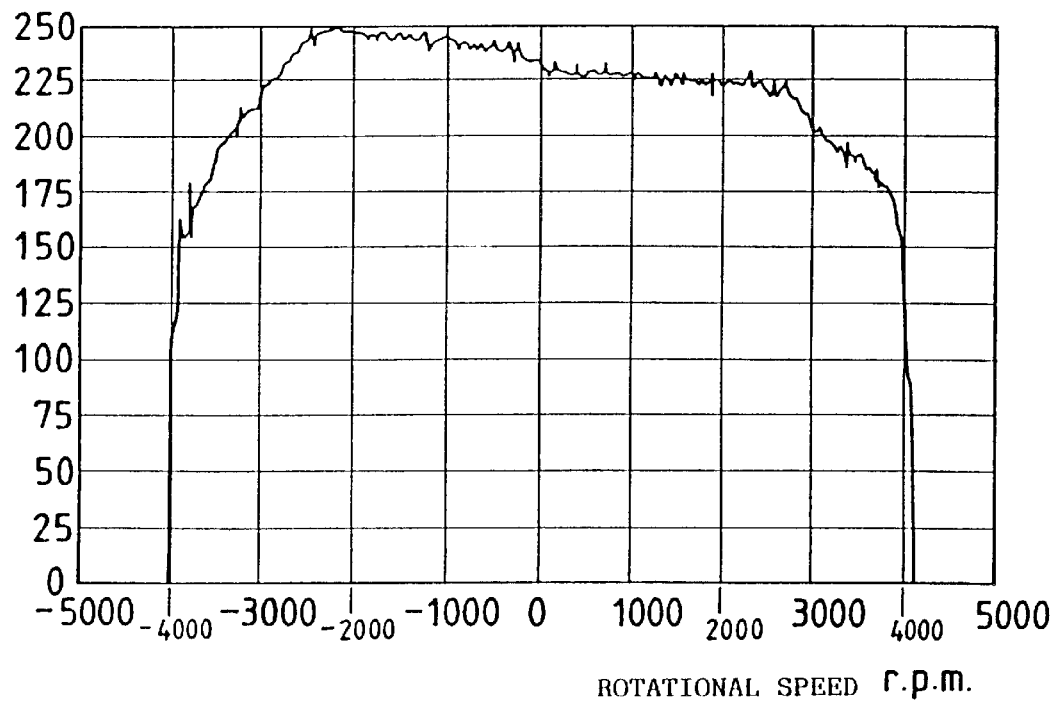
FIG. 6b is a graph showing a servomotor torque curve in accordance with the control method of the present invention.

FIG. 6a shows a servomotor torque curve obtained with a conventional control method, and FIG. 6b shows a servomotor torque curve obtained with the control method according to the present invention. These torque curves are plotted as the coordinates of the torque (kg·cm) and the rotational speed (r.p.m.).

Comparing the torque characteristics in the vicinity of the rotational speed 4000 rpm in FIG. 6a with the counterpart in FIG. 6b, it can be noticed that a down of the torque in the vicinity of 4000 rpm can be reduced to thus achieve higher torque in the high-speed region according to the control method of the present invention.

As described above, according to the present invention, the reactive current is reduced in a region in which voltage saturation does not occur, thereby suppressing the generation of heat caused by the reactive current, and also providing stable rotation even in the high-speed region.

We claim:

1. A method of controlling an electric current to be supplied to a servomotor by performing a speed loop process and a DQ conversion for converting a three-phase alternating current into a two-phase direct current including a d-phase current which does not contribute to a torque generated by the servomotor and a q-phase current which contributes to the torque generated by the servomotor and for converting the two-phase direct-current voltage to the three-phase alternating-current voltage, said method comprising the steps of:

(a) supplying a torque command obtained by the speed loop process to said q-phase and supplying no current to said d-phase when the servomotor is rotating at a low speed; and (b) supplying said torque command to said q-phase and supplying a reactive current in said d-phase to generate a voltage in an opposite direction to a counter-electromotive force generated in said q-phase due to the reactive current to thereby lower a terminal voltage of the servomotor when the servomotor is rotating at high speed.

2. An electric current control method for a servomotor according to claim 1, said step (b) including the steps of: starting the supply of said reactive current when a speed of the servomotor reaches a first speed set in the vicinity of a speed at which said counter-electromotive force increases to cause a voltage saturation; and increasing said reactive current in accordance with the speed of the servomotor.

3. An electric current control method for a servomotor according to claim 2, said step (b) including the steps of:

supplying said reactive current which increases in accordance with a positive linear function with respect to the speed of the servomotor; and setting said reactive current at a fixed value when the speed of the servomotor speed has become higher than or equal to a second speed which is higher than the first speed.

* * * * *